Dec. 13, 1932.   F. B. RAYNOR   1,891,012
DISPLAY DEVICE
Filed May 25, 1932
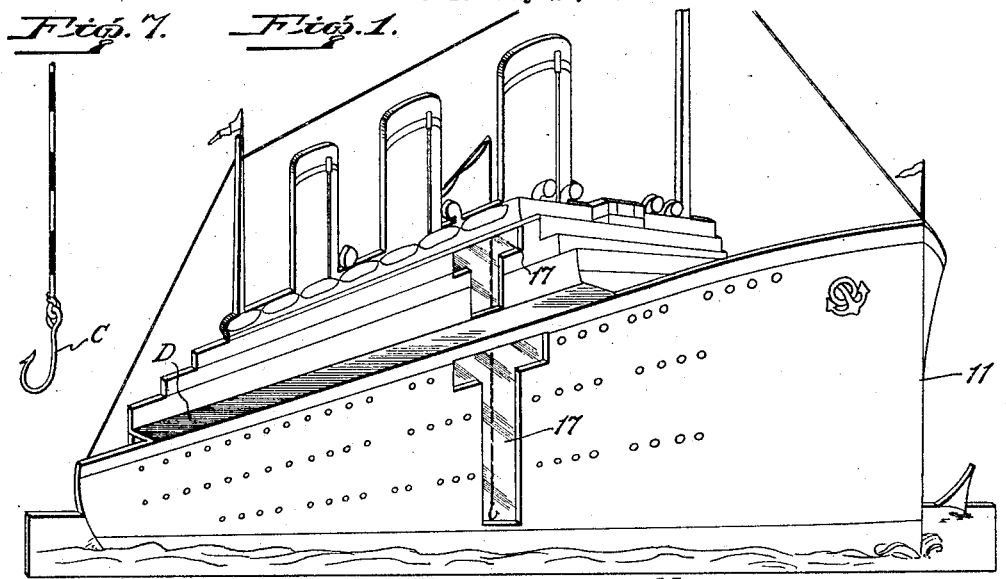
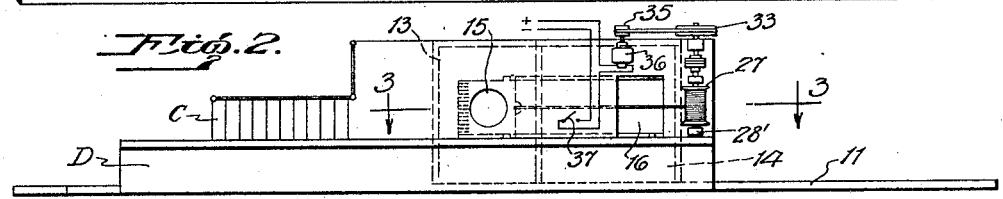
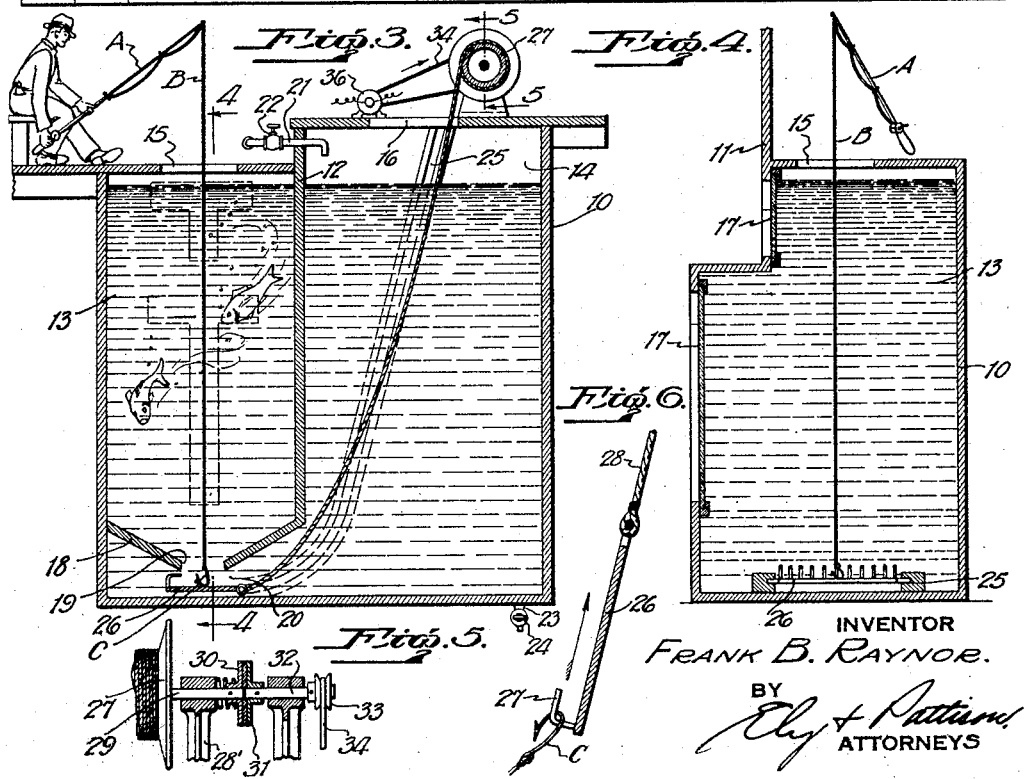
INVENTOR
FRANK B. RAYNOR.
BY
ATTORNEYS Patented Dec. 13, 1932

1,891,012

UNITED STATES PATENT OFFICE

FRANK B. RAYNOR, OF BALDWIN, NEW YORK

DISPLAY DEVICE

Application filed May 25, 1932. Serial No. 613,350.

This invention relates to improvements in display devices for advertising purposes.

The primary object of the invention resides in an illusion device for use as an advertising display which will impart to the onlookers the realistic appearance of a fisherman catching live fish upon a fishing line.

Another object of the invention is to provide a display device embodying a tank divided into two communicating compartments, one of which is provided with windows and into which a fishing line is dropped by a man suitably positioned in sight so that onlookers may view the man and the line passing downwardly and which line when reaching the bottom of the said compartment is rapidly drawn into the other compartment to impart the appearance that a fish has been caught, whereupon a live or imitation fish is manually attached to the line and the line reeled in with the fish attached thereto.

A further object of the invention is the provision of an advertising display device which is novel and simple of construction, and interesting and baffling to the onlooker.

With these and other objects in view, the invention resides in the combination and arrangement of parts, the essential features of which are hereinafter fully described, are particularly pointed out in the appended claims, and are illustrated in the accompanying drawing, in which:

Figure 1 is a perspective view of the invention,

Figure 2 is a top plan view thereof,

Figure 3 is an enlarged vertical sectional view on the line 3—3 of Figure 1,

Figure 4 is a vertical transverse sectional view on the line 4—4 of Figure 3,

Figure 5 is an enlarged detail vertical sectional view on the line 5—5 of Figure 3, Figure 6 is an enlarged detail sectional view through the pick-up carriage, Figure 7 is an enlarged detail elevational view of the lower end of the fishing line.

Referring to the drawing by reference characters, the numeral 10 designates a tank which in the present instance is shown as concealed behind an upstanding panel 11 simulating a steamship, although any other means may be embodied for camouflaging the tank if desired. The tank 10 is divided vertically by a partition 12 into communicating compartments 13 and 14, the top wall of the compartment 13 having a central opening 15 therein, while the top wall of the compartment 14 is provided with an opening 16. The front wall of the compartment 13 is provided with vertically aligned T-shaped windows 17 through which parts of the interior of the compartment 13 may be viewed from the outside.

The compartment 13 is provided with a centrally inclined bottom wall 18 provided with a central opening 19 which communicates with the compartment 14 through a restricted passage 20.

The tank 10 is adapted to be filled with water, and a pipe 21 leading from a source of supply and entering the tank 10 furnishes the same, and the flow is controlled by a valve 22. For draining the tank 10, a drain pipe 23 is provided in the bottom of the tank and a valve 24 is arranged therein for controlling the outflow.

Extending at an angle from a point adjacent the top of the compartment 14 and extending downwardly to a point adjacent the bottom of a compartment 13 are tracks or grooves 25 in which a carriage 26 is slidably mounted. The carriage 26 has one of its sides provided with prongs 27, while connected to the opposite side is one end of a flexible pull cable 28, the opposite end of the cable passing upwardly through the opening 16 and being windable upon a reel 27. The reel 27 is mounted on the top of the compartment 14 and is supported in bearings 28. The winding shaft 29 on which the reel is mounted has one end provided with a clutch element or disc 30 for frictional engagement with a clutch element 31 carried by a stub shaft 32 journaled in axial alinement with the shaft 29, and which stub shaft carries a pulley 33 over which a belt 34 passes. The belt 34 also passes over the pulley 35 of an electric motor 36. The electric motor 36 is arranged in an electric circuit with a control switch 37 whereby the motor may be turned on and off for the winding of the pull cable 28 upon the reel 27.

In practice, a real man takes a position on the top of the compartment 13, and carries a fishing rod A in his hand, while the line B which is supported by the rod carries a hook C at its lower end. The line B is shown in detail in Figure 7 of the drawing, and consists in providing alternate areas of contrasting colors for a purpose to be presently explained. The line B is dropped through the opening 15 in the compartment 13, and the carriage 26 is in its lowermost position as shown in Figure 3 of the drawing. As the line B is dropped into the compartment 13, the onlookers peering through the windows 17 will see the line passed downwardly, and the speed of travel may be visibly discerned by reason of the contrasting colored areas on the line. When reaching the lower end of the compartment 13, the hook drops upon the carriage 26 and an operator stationed upon the top of the compartment 14 but concealed by the panel 11 places the motor in operation, whereupon the reel 27 is rotated to wind the pull cable 28 thereon, and as the carriage 26 starts its upward movement the fishing hook C is caught by one of the teeth 27 as shown in Figure 6, whereupon a jerk is applied to the lower end of the fishing line and imparts to the onlookers that the fisherman stationed on top of the compartment 13 has a "bite". The carriage 26 is hauled to the top of the compartment 14 where the operator places a "dummy" or real fish upon the hook C and releases the same into the compartment 14, the man on top of the compartment 13 then proceeds to reel in the line B with the fish on the lower end thereof, and his antics are typical of a fisherman when landing a fish on a rod and line.

From the description, it will be seen that persons positioned at the front of the device can only view the lines through the windows 17, but the movements of the man on top of the compartment 13 are visible to the onlooker. As before stated, the accomplice who picks up the hook end of the line and applies the fish thereto is hidden behind the panel 11, and cannot be seen by any one stationed at the front of the device.

In addition to producting the illusion of catching a real fish, the same imparts an additional illusion that the line B drops downward into a tank which is of a much greater depth than the depth of the tank 13, as the lower end of the line is pulled into the compartment 14.

As before stated, the device is shown in the form of a steamship in which a portion is stopped back to provide a deck D, while steps E lead from the supporting surface up to the platform on top of the tank 10.

If desired, the display device may be built in a wall in restaurants and like places where it might be desired to advertise fresh sea food, but other similar displays may be provided if desired.

While I have shown and described what I deem to be the most desirable embodiment of my invention, I wish it to be understood that such changes as come within the scope of the appended claims may be resorted to if desired.

Having thus described the invention, what I claim as new and desire to secure by Letters Patent of the United States, is:—

1. A display device comprising a pair of communicating compartments adapted to contain water, windows provided in one of said compartments, a line adapted to be dropped into the window compartment, and means for drawing said line into the other compartment to enable the attachment of an object thereon.

2. An illusion display device comprising a tank adapted to contain water and having windows therein, a fishing line adapted to be lowered into said tank to be viewed through said windows, and means by which the lowered end of said fishing line may be drawn to a position not visible through said windows to enable the attachment of an object thereon.

3. An illusion display device comprising a tank divided by a partition into two communicating compartments, the top walls of said compartments having openings therein, windows provided in a wall of one of said compartments, a fishing line adapted to be lowered into the compartment in which the windows are provided, and means for drawing the lower end of said fishing line into the other compartment to a position adjacent the opening therein to enable the manual attachment of an object thereon by a person adapted to be positioned upon the top of said last mentioned compartment.

4. An illusion display device comprising a tank divided by a partition into two communicating compartments, the top walls of said compartments having openings therein, windows provided in a wall of one of said compartments, a fishing line adapted to be lowered into the compartment in which the windows are provided, and means for drawing the lower end of said fishing line into the other compartment to a position adjacent the opening therein to enable the manual attachment of an object thereon by a person adapted to be positioned upon the top of said last mentioned compartment, and a wall rising upwardly from the top of said last mentioned compartment to shield a person stationed thereon.

5. An illusion display device comprising a tank divided by a partition into two communicating compartments, the top walls of said compartments having openings therein, windows provided in a wall of one of said compartments, a fishing line adapted to be lowered into the compartment in which the windows are provided, and means for drawing the lower end of said fishing line into the other compartment to a position adjacent the opening therein to enable the manual attachment of an object thereon by a person adapted to be positioned upon the top of said last mentioned compartment, said means including a carriage mounted for sliding movement from the bottom of said first mentioned compartment to the top of said other compartment, and a pull cable connected to said carriage and extending through the opening in said last mentioned compartment.

6. An illusion display device comprising a tank divided by a partition into two communicating compartments, the top walls of said comaprtments having openings therein, windows provided in a wall of one of said compartments, a fishing line adapted to be lowered into the compartment in which the windows are provided, and means for drawing the lower end of said fishing line into the other compartment to a position adjacent the opening therein to enable the manual attachment of an objects thereon by a person adapted to be positioned upon the top of said last mentioned compartment, said means including a carriage mounted for sliding movement from the bottom of said first mentioned compartment to the top of said other compartment, and a pull cable connected to said carriage and extending through the opening in said last mentioned compartment, and motor operated means for reeling in and paying out said pull cable.

7. An illusion device including a tank having windows therein, a line adapted to be lowered into said tank, and markings on said line for producing an illusion when looking through said windows that the line is passing downward to a depth greater than the depth of said tank.

Signed at New York, New York this 23rd day of May, 1932.

FRANK B. RAYNOR.